United States Patent Office 3,460,023
Patented Aug. 5, 1969

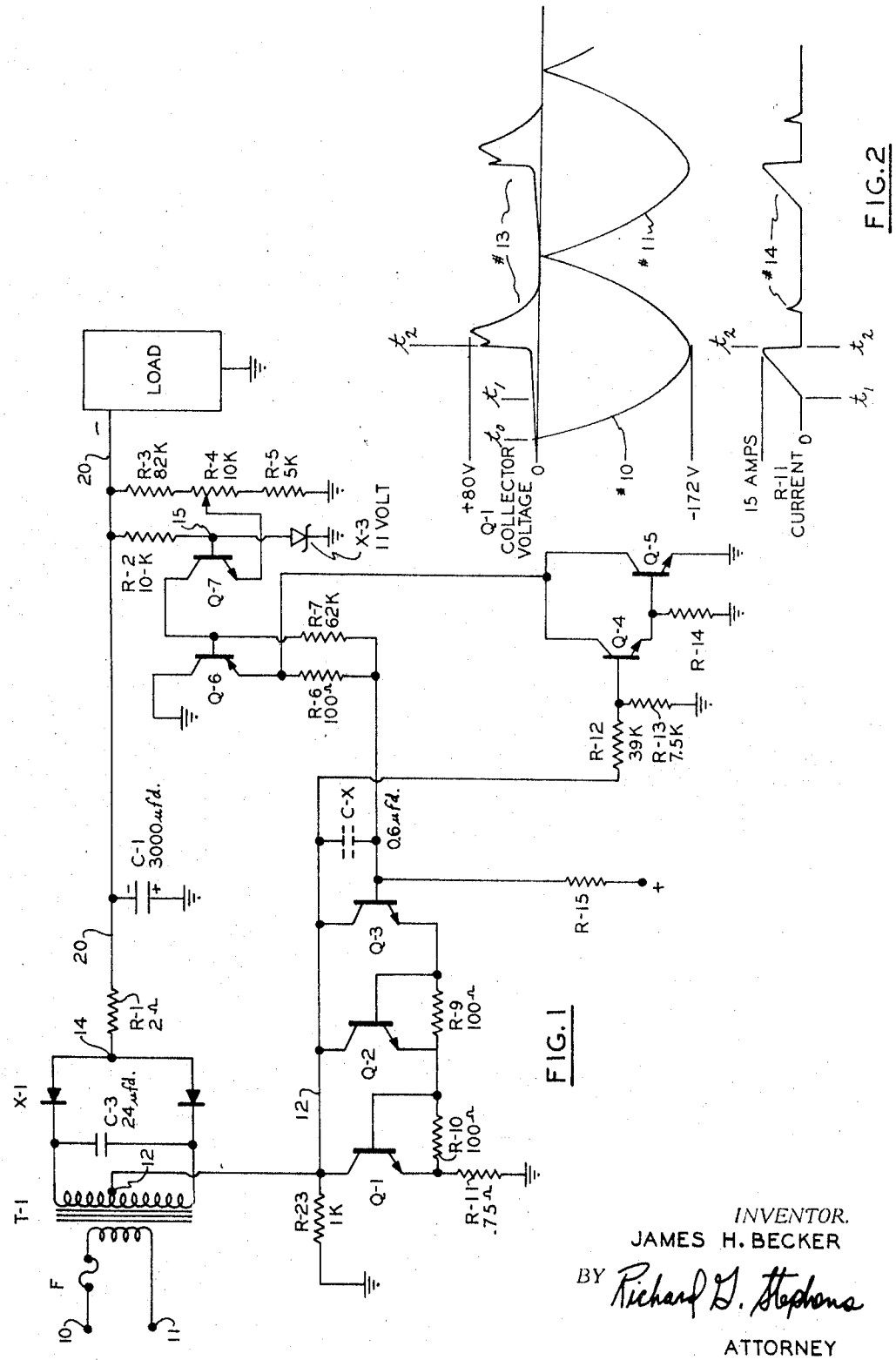

3,460,023
REGULATED POWER SUPPLY
James H. Becker, Ann Arbor, Mich., assignor to Applied Dynamics, Inc., Ann Arbor, Mich., a corporation of Michigan
Filed Mar. 27, 1967, Ser. No. 626,067
Int. Cl. H02m 1/08, 7/20
U.S. Cl. 321—18                                9 Claims

ABSTRACT OF THE DISCLOSURE

A direct current regulated supply including a switching transistor in series with a rectifier and the alternating source, with the transistor normally biased on, with auxiliary transistor circuitry for rapidly cutting off the transistor whenever the output voltage exceeds a predetermined level (and whenever the current through the transistor exceeds a predetermined level).

---

My invention relates to a regulated direct current power supply, and more particularly, to a simple, economical and reliable DC power supply of improved efficiency suitable for use in a variety of analog computer, automatic control and instrumentation applications.

Many known regulated DC power supplies control their output voltages by series regulation, i.e., by provision of variable impedance devices which drop gradually changing amounts of voltage during each alternating supply input cycle when the instantaneous value of the output voltage departs from a predetremined level. Such regulator systems are disadvantageous in that considerable power may have to be dissipated in resistive elements or semiconductors in order to achieve regulation over an acceptable range, so that such regulated power supplies are quite inefficient. Several known SCR regulated power supply circuits are efficient, as they do not series regulate, but instead switch rapidly between full on and full off conditions, but they have other disadvantages, including limited regulating speed, and more importantly for many applications, the disadvantage of providing very "noisy" output pulses. Most otherwise suitable SCR regulated power supplies cannot be used with modern electronic computers without extensive filtering and shielding. It is a primary object of the present invention to provide a regulated direct current power supply which is efficient, and which avoids the use of silicon controlled rectifiers or similar noisy switching devices. Another object of the invention is to provide a regulated direct current power supply having improved regulating speed. A further object of the invention is to provide an improved regulated direct current power supply which may simply and economically incorporate both output voltage and current regulation. Still another object of the invention is to provide an improved regulated supply of the type described which is fairly insensitive to line voltage fluctuations.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIG. 1 is an electrical schematic diagram of one exemplary embodiment of the invention, with several parts shown in dashed lines which may be added in an alternative embodiment of the invention.

FIG. 2 is a group of waveforms useful in understanding the operation of the invention.

The circuit of FIG. 1 may be operated in two somewhat different modes with some very slight modifications. In the principal and most efficient mode, an "on bias current" is provided through resistor R–15 from a separate positive DC voltage source (not shown). If a separate positive source is not available, the circuit of FIG. 1 still may be operated, though less efficiently, by eliminating resistor R–15, and instead connecting a capacitor between the collector and base of transistor Q–3, such as the capacitor C–X shown in dotted lines in FIG. 1, and providing a resistor such as R–23 between line 12 and ground. The alternative connection lengthens the turn-off time of transistors Q–1, Q–2 and Q–3, resulting in more dissipation than otherwise, but still providing wholly satisfactory operation for many applications.

In FIG. 1 is will be seen that center-tap terminal 12 of the transformer secondary winding, instead of being grounded as in the usual power supply, is returned to ground through the collector-emitter circuit of power transistor Q–1 and a small series current-metering resistance R–11. During one or more portons of one half-cycle of this voltage induced in the secondary winding, rectifier diode X–1 conducts and current flows in a series circuit which includes diode X–1, the upper half of the secondary winding, transistor Q–1, resistor R–11, the load and filter capacitor C–1, and resistor R–1 back to diode X–1. This half-cycle is shown between zero and 180 degrees in FIG. 2. FIG. 2 shows at #10 the voltage which would appear at terminal 14 during this half-cycle in the absence of regulation and filtering.

During one or more portions of the other half-cycle, diode X–2 conducts and current flows in a series circuit which includes diode X–2, the lower half of the secondary winding, transistor Q–1, resistor R–11, the load and filter capacitor C–1, and resistor R–1 back to diode X–2. This latter half-cycle is shown between 180 and 360 degrees in FIG. 2. FIG. 2 shows at #11 the voltage which would appear at terminal 14 during this latter half-cycle in the absence of regulation and filtering.

In the invention transistor Q–1 acts as a switch which connects the diode X–1 circuit to charge up capacitor C–1 and feed the load at one or two times during the first (0–180 degree) half of the cycle, and which similarly connects diode X–2 at one or two times during the second (180–360 degrees) half of the cycle. If the load is light, transistor switch Q–1 will tend to be closed only for a single period near the beginning of each half-cycle. However, if the load is heavy, so that the output voltage decays markedly during each half-cycle after Q–1 is turned off, Q–1 will tend to be turned on again for a brief interval near the end of each half-cycle. Transistor Q–1 is driven rapidly between low voltage-high current "closed" conditions and high voltage-low current "open" conditions, in both of which conditions the power dissipation in transistor Q–1 is small. With the cathodes of rectifier diodes X–1 and X–2 connected to the transformer secondary terminals, it will be appreciated that terminal 14 will become negative with respect to ground. The voltage on terminal 14 is connected as shown through a small current-limiting resistor R–1 and across main storage capacitor C–1, thereby providing at terminal 20 an output voltage which is negative with respect to ground.

At the beginning portion of each half-cycle of the alternating voltage at the transformer secondary, current is supplied through one rectifier or the other (i.e., through X–1 or X–2) to supply the load and charge up capacitor C–1. When, during a given half-cycle, capacitor C–1 is sufficiently charged at a given instant, switching transistor Q–1 is opened. In the case of no-load or light loads, transistor switch Q-1 then will remain open for the rest of the half-cycle, or even for plural half-cycles. In the case of heavier loads, which cause more rapid decay of the output voltage, transistor Q-1 will close again within one or a few half-cycles, and in the case of even heavier loads, switch Q-1 may close again for the second time near the tail-end of the same half-cycle.

To determine whether storage capacitor C-1 is sufficiently charged at a given instant during a given half-cycle, the output voltage on output terminal 20 is applied across a voltage divider comprising resistors R-3 and R-5, and potentiometer R-4, which may be adjusted to determine the desired output voltage level. Transistor Q-7 acts as a comparator, to compare the voltage on the potentiometer R-4 wiper arm and the Q-7 emitter with the voltage on terminal 15, the magnitude of which is accurately determined by the current flow through Zener diode X-3. During a given half-cycle, when the output voltage on line 20 becomes sufficiently large (negative), transistor Q-7 will be immediately turned on, turning on transistor Q-6 and thereby pulling the Q-3 base in a negative direction and rapidly turning off transistors Q-3, Q-2 and Q-1. If there were absolutely no load connected to the supply, transistors Q-7 and Q-6 would remain on and transistors Q-3, Q-2 and Q-1 remain off, indefinitely. However, the Q-7 comparator circuit itself comprises some load, so that the output voltage always decays, even though sometimes very slightly, as soon as switch transistor Q-1 is opened.

Waveform #13 in FIG. 2 shows the voltage on the Q-1 collector (terminal 12) and waveform #14 shows the current through transistor Q-1, which was determined by measuring the voltage across R-11. The voltage begins to build up across one half of the secondary winding, and when the voltage across rectifier X-1 and the transformer exceeds that stored in the storage capacitor plus the diode X-1 contact potential, current begins to flow, as shown at time $t_1$ in FIG. 2. The current will be seen at #14 to increase rather linearly until time $t_2$, and simultaneously the Q-1 collector voltage will rise slightly due to the IR drop across resistor R-11. At time $t_2$ the Q-7 comparator opens the Q-1 switch cutting off the flow of current. When transistor Q-1 opens, the flux collapse in the transformer secondary causes a spike shown at $t_2$ in waveform #13. Capacitor C-3 is provided to limit the amplitude of such spikes in order to prevent transistors Q-1, Q-2, and Q-3 from being damaged.

Irrespective of the spike generated by flux collapse, the opening of transistor switch Q-1 at time $t_2$ will be seen to cause a sudden and large increase in voltage on the Q-1 collector, thereby turning on transistors Q-4 and Q-5, and thereby turning off even harder transistors Q-3, Q-2, and Q-1. If the output voltage on line 20 decays sufficiently slowly during the remainder of the half-cycle, Q-7 will remain conducting, holding Q-6 conducting and thereby holding Q-3, Q-2, and Q-1 cut off for the remainder of the half-cycle. If, on the other hand, a heavy load causes the output voltage on terminal 20 to decay rapidly enough, transistor Q-7 will be turned off, turning off Q-6. At some time later, during the same half-cycle, when the Q-1 collector voltage on line 12 has dropped sufficiently (to about 20 volts with the circuit values shown), the decreased voltage on line 12 will cause transistors Q-4 and Q-5 to turn off, thereby turning on Q-3, Q-2, and Q-1 for a further interval during the last portion of the half-cycle, and leaving them turned on as the next half-cycle begins. Thus it will be seen that the function of the Q-7 comparator circuit is to turn off switching transistors Q-3, Q-2, Q-1 whenever the output voltage increases up to the level selected by adjustment of potentiometer R-4 and the voltage of Zener diode X-3, and it will be seen that the comparator circuit performs this function substantially independently of the amplitude of the transformer secondary voltage (or the line voltage applied to the transformer primary winding). It will also be understood at this point that the Q-4, Q-5 circuit functions to sense the voltage on the Q-1 collector and aid in turning off Q-1 when the Q-7 comparator circuit begins to turn off Q-1. As will be explained below, the Q-4, Q-5 circuit also serves as a current-limit sensing circuit, to open Q-1 in the event of excess current, irrespective of the level of the output voltage. The line voltage may flutuate considerably from its nominal or rated value and the Q-7 comparator circuit will still turn off switch Q-1 in any half-cycle at the proper voltage level. The operation of the circuit of FIG. 1 during the other half-cycle when rectifier X-2 conducts is, of course, identical to the operation described above and need not be described in detail. Furthermore, it will be apparent at this point that the invention may be utilized as well with a half-wave rectifier circuit as with the full-wave system shown, with minor adjustments which will be apparent to those skilled in the art. It is unnecessary, of course, that a transformer secondary winding be used, and some embodiments of the invention will be fed directly from single-phase line voltage.

During any given half-cycle when transistor Q-1 is conducting, the small collector-emitter drop across Q-1 and the voltage drop across resistor R-11 due to the current flowing through resistor R-11 will be seen to determine the voltage of the Q-1 collector with respect to ground, and throughout each Q-1 conduction period the voltage of the Q-1 collector with respect to ground will be seen to remain small. The Q-1 collector will go slightly more positive, of course, as more current flows through Q-1. The Q-1 collector voltage is applied through scaling resistor R-12, not only to speed the turn-off of Q-1 when the output voltage exceeds a selected level, but also to turn on transistor Q-4, and thereby turn on transistor Q-5, whenever the Q-1 transistor current exceeds a predetermined desired limit. When transistor Q-5 conducts, substantially grounding the Q-6 emitter and removing the bias current from transistor Q-3, it will be seen that transistors Q-3, Q-2, and Q-1 will be turned off. Because Q-1 turn off causes its collector immediately to swing far more positive than it ever becomes during Q-1 conduction (irrespective of whether turnoff is caused by voltage comparison by Q-7 or by current metering), a cumulative or regenerative action occurs, with Q-1 being rapidly cut off and transistors Q-4 and Q-5 being turned on, so that the drawing of current in excess of the predetermined desired amount during any given half-cycle rapidly shuts off Q-1. Thus either increase of output voltage to a selected level or increase of current above a predetermined level during any half-cycle serves immediately to shut off transistor switch Q-1. As well as shutting off switch Q-1 under excessive load conditions during operation, the operation of Q-4 by the drop across resistor R-11 prevents fuse blowout when the supply is first turned on.

In the alternative embodiment of the invention, the positive "on bias" current source and resistor R-15 are omitted, and capacitor C-X may be connected as shown between collector and base of transistor Q-3. With such an arrangement, capacitor C-X is charged up through R-6 and Q-6 each time switch Q-1 opens and its collector (line 12) goes positive, slowing down somewhat the turn on of Q-4 and Q-5 and slowing down the turn off of Q-3, Q-2, and Q-1, but when Q-6 later turns off to turn on Q-3, Q-2, and Q-1, capacitor C-X supplies the bias current necessary for Q-3 to turn on. Resistor R-23, which is used only in the alternative embodiment, is provided for the purpose of discharging capacitor C-X at the cessation of current pulses.

Rearrangement of the circut to provide an output which is positive with respect to ground will be obvious to those skilled in the art. The circuit values shown in FIG. 1 are, of course, merely exemplary. In some applications, the output voltage on line 20 will be further filtered and/or further regulated by any one of a number of known filters and/or regulators before being applied to the ultimate load.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

I claim:
1. A regulated direct current power supply, comprising, in combination: a source of rectified unfiltered direct voltage including an alternating voltage source and a rectifier means connected in series; a power transistor having a base terminal and collector and emitter electrodes; first circuit means connecting said direct voltage source, said rectifier means and said transistor in a series circuit between an output terminal and a reference terminal; a capacitor and a load each connected between said output terminal and said reference terminal; driver amplifier means responsive to an applied input current to provide a bias current to said base terminal normally to bias said transistor into saturation; second circuit means for normally applying a first input current to said driver amplifier means; comparator means connected between said output terminal and said reference terminal for providing a switching signal whenever the voltage between said output terminal and said reference terminal exceeds a selected level; third circuit means connecting said switching signal to said driver amplifier means to decrease said bias current and thereby cause the voltage across said transistor to increase; and amplifying means responsive to an increase in voltage across said transistor for further decreasing said bias current to cut off said transistor.

2. A power supply according to claim 1 having an impedance connected in series with said electrodes of said transistor, and in which said power supply includes means responsive to an increase in voltage across said impedance for decreasing said bias current to cut off said transistor.

3. A power supply according to claim 1 in which said second circuit means comprises a resistance connected between a further source of direct voltage and said driver amplifier means.

4. A power supply according to claim 1 in which said second circuit means compirses capacitor means connected between said collector electrode and said driver amplifier means.

5. A power supply according to claim 1 in which said comparator means comprises a voltage divider connected between said output terminal and said reference terminal and having a tap terminal; a source of constant voltage, and a second transistor responsive to the voltage at said tap terminal and said constant voltage and operative to provide said switching signal when said voltage at said tap terminal exceeds said constant voltage.

6. A power supply according to claim 1 in which said amplifying means is operative in response to said increase in voltage across said transistor for diverting a portion of said first input current from said driver amplifier means.

7. A power supply according to claim 1 in which said driver amplifier means comprises a second transistor having a base terminal and collector and emitter electrodes, the collector electrode of said second transistor being connected to the collector electrode of said power transistor, the emitter electrode of said second transistor being connector to the emitter electrode of said power transistor through an impedance, and said first input current being connected to said base terminal of said second transistor.

8. A power supply according to claim 2 wherein said amplifying means is connected to be responsive to both the voltage across said transistor and the voltage across said impedance.

9. A power supply according to claim 5 in which said third circuit means comprises a third transistor responsive to said switching signal and operative to divert a portion of said first input current from said driver amplifier means.

References Cited
UNITED STATES PATENTS

| | | | |
|---|---|---|---|
| 3,096,475 | 7/1963 | Brooks. | |
| 3,158,801 | 11/1964 | Tighe et al. | |
| 3,196,344 | 7/1965 | Walker. | |
| 3,204,174 | 8/1965 | Clerc | 321—16 XR |
| 3,213,350 | 10/1965 | Armour | 321—18 |
| 3,213,351 | 10/1965 | Walker | 321—18 |
| 3,319,150 | 5/1967 | Elich et al. | 321—18 |
| 3,335,361 | 8/1967 | Natale et al. | |

JOHN F. COUCH, Primary Examiner
W. M. SHOOP, Jr., Assistant Examiner

U.S. Cl. X.R.
321—19; 323—22, 38